SINGLE TRACK CHARACTER SENSING

Filed Oct. 15, 1958 6 Sheets-Sheet 1

INVENTORS
ROBERT J. FURR
JAMES A. WEIDENHAMMER
JOHN E. PIERPONT JR.
GLENMORE L. SHELTON JR.
BY
ATTORNEY

Dec. 10, 1963 R. J. FURR ETAL 3,114,131

SINGLE TRACK CHARACTER SENSING

Filed Oct. 15, 1958 6 Sheets-Sheet 3

SINGLE TRACK CHARACTER SENSING

Filed Oct. 15, 1958

6 Sheets-Sheet 6

United States Patent Office 3,114,131
Patented Dec. 10, 1963

3,114,131
SINGLE TRACK CHARACTER SENSING
Robert J. Furr and John E. Pierpont, Jr., Poughkeepsie, Glenmore L. Shelton, Jr., Mahopac, and James A. Weidenhammer, Poughkeepsie, N.Y., assignors to International Business Machines Corporation, New York, N.Y., a corporation of New York
Filed Oct. 15, 1958, Ser. No. 767,473
2 Claims. (Cl. 340—146.3)

This invention relates to a single track character reading scheme and more particularly to a system for reading characters printed in human language in which the characters are stylized human language characters and which the recognition apparatus is particularly designed for but not necessarily limited to reading this type of character.

Heretofore, numerous arrangements have been proposed for facsimile reproduction. In these arrangements the character is translated bit by bit but is never recognized as a whole.

Other arrangements have been proposed for reading code elements. While these arrangements are responsive to a particular sequence of code bits, they do not involve the recognition of characters.

Recognition systems have also been proposed which serve to integrate the output signals received when various codes or characters are scanned. These arrangements propose various apparatus responsive to the integrated outputs. Other systems have been proposed involving multichannel scanning of characters and manipulation of the outputs of the various channels in numerous manners by which character recognition is purportedly obtained. These systems all represent either systems which are not character recognition systems or systems which require complex arrays of apparatus to provide the desired results.

It is, accordingly, the object of the present invention to provide a relatively simple system by which human language characters may be recognized.

More specifically, it is one object of the present invention to provide stylized characters which, when printed on a record member and linearly scanned with a single channel scanning means, will produce output signals having the form of the derivative of a signal representing the printed and non-printed surface of the character bearing record member being scanned, in which each character derivative output signal is of individual and distinct formation and provides means by which the character scanned may be recognized.

Our invention recognizes that human language numeric character stylized to present when linearly scanned substantially uninterrupted straight lines of various widths and spacing extending transversely to the direction of scanning will provide highly distinctive derivative signals while also being only minorly distorted from conventional formations of the human language characters.

A recognition system desirably employed with this type of character is a system involving a time polarity matrix storage system for storing the relative polarity and sequential time positions of the derivative pulses. Outputs from selected groups of storage elements are delivered to recognition circuits, each responsive to a particular character.

Accordingly, it is a further object of the invention to provide a stylized set of numeric characters of the formation noted above in combination with a unique arrangement of the recognition system noted above which is particularly responsive to the particular derivative output signals provided by the characters.

This invention may be employed for direct reading of numeric characters in place of previously employed code bit reading such as, for example, that described in the patent application of Edminster et al., Serial No. 631,925 filed December 31, 1956, now U.S. Patent No. 3,039,682, issued June 19, 1962, disclosing bank check sorter reader apparatus.

The foregoing and other objects of the invention relating particularly to the structure and function thereof will become evident from the following description when read in conjunction with the accompanying drawings in which:

FIGURE 1*a* shows the form of the stylized numeric characters involved in the invention.

FIGURE 1*b* shows the output wave form resulting when each of the characters of FIGURE 1*a* is scanned by a single channel linearly moving scanning means.

FIGURES 2*a* and 2*b* form a diagram showing the electrical system for receiving the output signals shown in FIGURE 1*b* and for storing the signal information in a time polarity storage matrix.

Figure 1A:
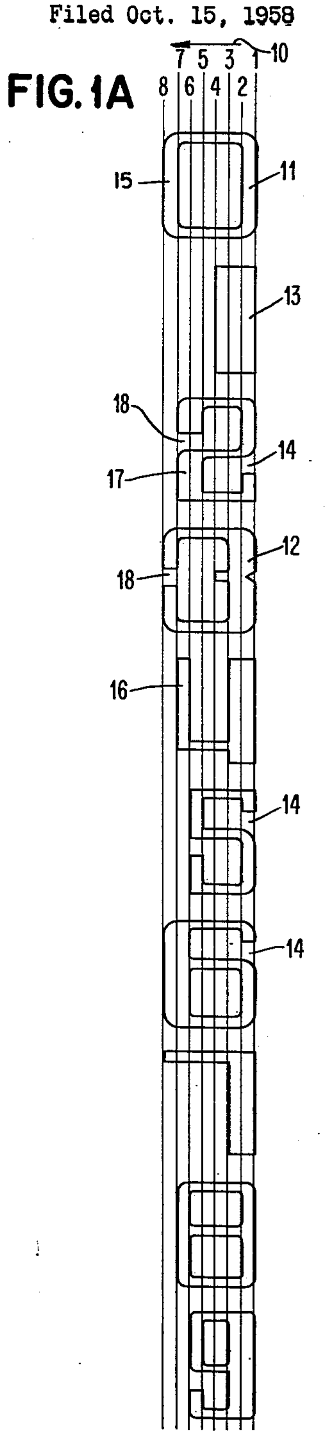

In FIGURE 1*a* there is shown numeric characters 0–9 embodying the stylized configurations employed in the invention to provide unique output wave forms from scanning means linearly scanning the characters. The direction of scan is indicated by the arrow 10 and vertical lines drawn through the characters and numbered 1–8 indicate the commencement of time intervals extending during the period of character scanning. In the operation of the system as described herein, the characters are printed in magnetic ink on a suitable record member and scanned by magnetic sensing means. It should be noted, however, that the invention could be embodied in apparatus employing optical scanning means.

It will be seen from FIGURE 1*a* that the character 0 is formed with its right hand side on line 11, i.e., the onset line in the direction of the scan, having a line width equal to the width of one time interval. The character 3 has its right hand side 12 equal to the width of two time intervals. The character 1 is equal in width to three time intervals. Thus, the onset side lines of the characters are of various widths. However, all of the onset lines extend for substantially the full height of the character. For example, the characters 2, 5, and 6 have relatively small openings as indicated at 14 and thus, the vertical length of the onset line of the characters 2, 5, and 6 is substantially the same as that of the characters 0, 1, 3 etc. having uninterrupted onset lines.

The trailing or left hand side lines of the characters in the direction of scan have various line widths and are positioned at various time spacings from the leading side lines of the characters. For example, the character 0 has a trailing side line 15 which is 1 time interval wide and occupies the 7th time interval. The character 4 has a trailing side line 16 which is 1 time interval wide but occupies the 6th time interval. The character 2 has a trailing side line 17 two time intervals wide and occupying the 5th and 6th time intervals. Thus, the trailing side lines as well as the leading side lines occupy various numbers of time intervals but the trailing side lines unlike the leading side lines occupy both various time zones and various numbers of time zones.

Also, it should be noted that the trailing side lines are substantially uninterrupted lines. The numerals 2 and 3 have relatively small gap openings as indicated at 18, and the numeral 4 has a trailing edge line as indicated at 16 which is substantially equal to the height of its leading side line.

Figure 1B:
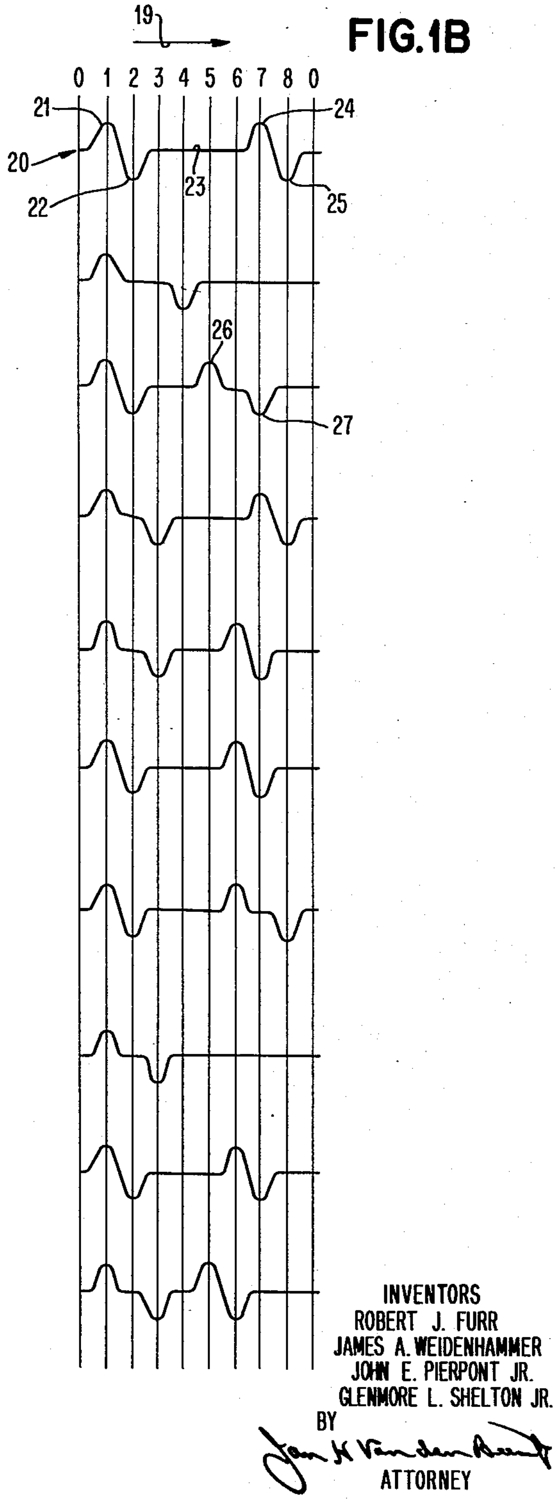

In FIGURE 1*b* there is shown vertical time lines 0–8 indicating the sampling times and defining sampling time intervals as previously discussed in connection with FIGURE 1*a*. The direction of scan in FIGURE 1*b* is indicated by the arrow 19. The wave forms shown in FIGURE 1*b* are each representative of the wave form producted by a single channel magnetic scanning head scanning the adjacent numeric character shown in FIGURE 1*a* in a linear direction and in the direction of the arrow 10 in FIGURE 1*a*.

A magnetic head scanning a magnetized area will produce, as an output signal, the derivative function of a curve indicating the magnetic and non-magnetic areas scanned. Thus, in the output curve for the character 0 as indicated at 20, a positive pulse 21 occurs at the first sampling time i.e., the time when the scanning head was crossing from a non-magnetic area to a first magnetic area and entering upon the line 11 of the character 0 in FIGURE 1*a*. As the magnetic scanning head passes off of the 0 character line 11 at the second time line shown in FIGURE 1*a*, a negative derivative output pulse 22 occurs in the output wave. During the time interval when the magnetic scanning head is crossing through the internal portion of the character 0, there is produced substantially a zero output and this is indicated by the zero level line 23. Just as there occurred a positive and negative derivative pulse as the head entered upon and passed off of the vertical line 11 of the character 0, there is similarly produced a positive derivative pulse 24 and a negative derivative pulse 25 as the head crosses the vertical line 15 of the character 0.

If the characteristics of the scanning circuit are selected in conjunction with the time intervals shown in FIGURES 1*a* and 1*b* so as to provide, when scanning a character line width of one time interval as shown in FIGURE 1*a*, full positive and negative derivative pulse outputs, as indicated at 21 and 22 in FIGURE 1*b*, then this character line width may be used as a base and multiples of this line width may be used in the formation of the various characters to distinguish various characters from one another.

For example, the distinction between the character 0 and the character 2 is substantially unnoticeable insofar as the onset line of these two characters is concerned. Both of the characters are drawn with a one time interval onset line and the slight interruption of this line in the character 2 as indicated at 14 is insufficient to make any appreciable difference between the amplitudes of the derivative output pulses resulting when these characters are scanned. However, it will be observed that the trailing edge 15 of the character 0 occupies the 7th time interval and has a width of one time interval. Thus, the positive and negative derivative output pulses 24 and 25 resulting therefrom occur at adjacent sampling times. On the other hand, the character 2 is drawn with a trailing edge having a width of 2 time intervals and occupying the 5th and 6th time intervals. Thus, the derivative output pulses produced by this trailing edge line of the character 2 are in the form of a positive output pulse 26 on the 5th time line and a negative derivative pulse 27 on the 7th time line. Accordingly, the distinction in the positions between the character 0 output pulses 24 and 25 and the character 2 output pulses 26 and 27 make possible the respective identification of these two characters. It will be evident from viewing FIGURE 1*b* that the respective output signals shown adjacent to the various character 0–9 shown in FIGURE 1*a* are each sufficiently individualistic to permit identification of the character which has produced the output signal.

The following conditions satisfied by each of the characters are of particular note:

(1) The substantially full height vertical lines on the onset side of each character provide substantially uniform and maximum amplitude pulses for each character recording. This uniform full height front gives the substantially full height time pulse by which the timing of the sampling times for each character interval may be determined.

(2) The characters 1 and 7 employ one line per character and the remaining characters employ two lines per character. However, all of these lines are of substantially the same height and thus, the pulses conveying the desired intelligence are all of substantially the same height and may be readily discriminated from background noises.

(3) Due to the fact that the time intervals at which the pulses occur in the output waves are coincident with predetermined sampling times, the time of possible occurrence of the pulses is known and thus the pulses may be more easily detected and discriminated against background noises.

Figure 2A:
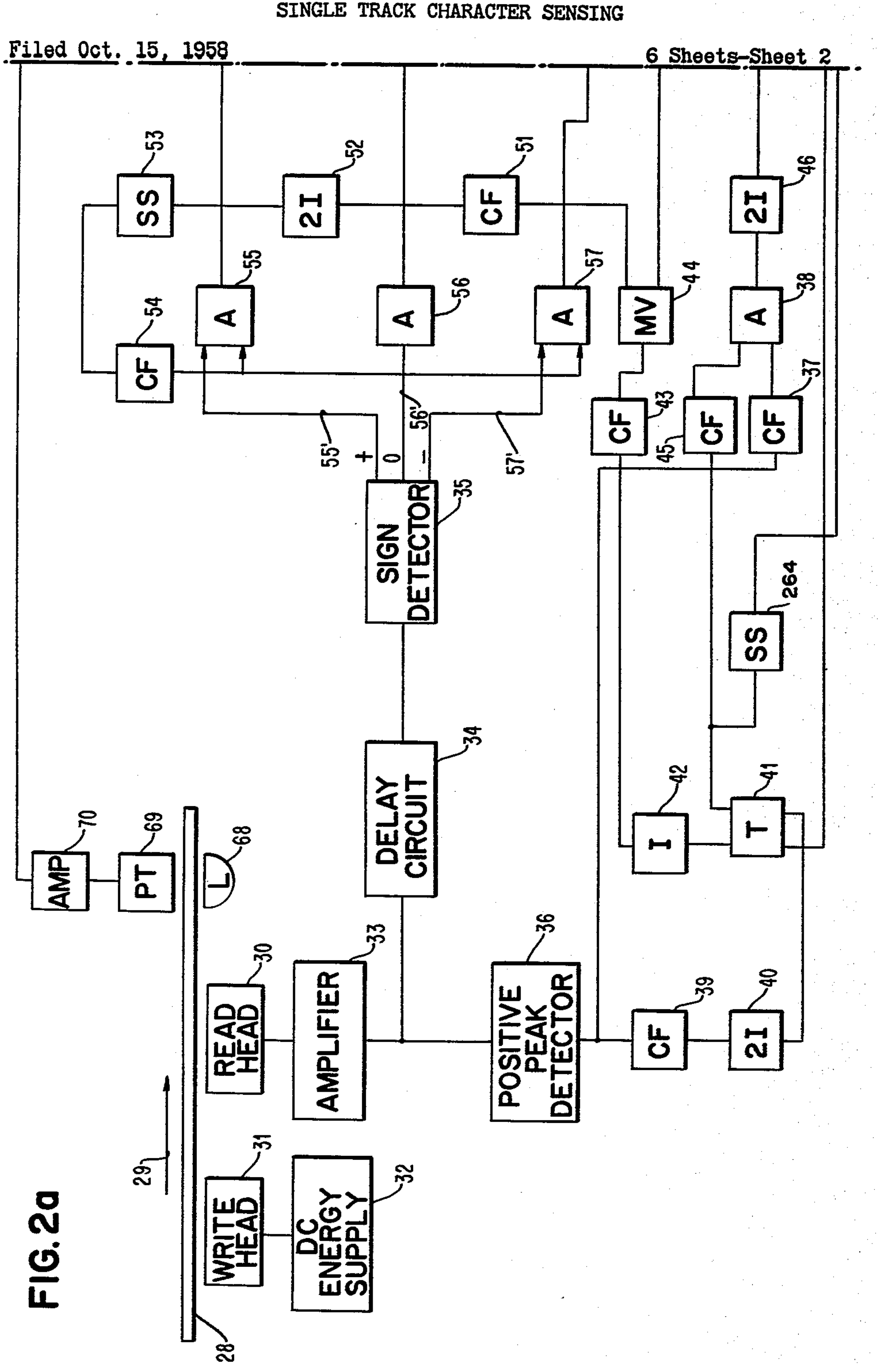

In FIGURE 2*a* there is shown at 28 a bank check or other document having printed thereon in magnetic ink numeric characters in the form of those shown in FIGURE 1*a*. The document is advanced in the direction of the arrow 29 past a single channel magnetic read head 30, which scans the entire character. Prior to the reading, the magnetic characters are passed adjacent to a D.C. write head 31. The write head may be energized by a permanent magnet or by a suitable D.C. energy supply as indicated at 32. The read and write heads may be of conventional construction and thus need not be described in detail herein.

Each character passing over the read head 30 will produce an output wave having a form in accordance with the particular numeric character formation as has been described in connection with FIGURES 1*a* and 1*b*. The read head output signals are passed through an amplifier 33 for voltage amplification. The output from the amplifier is delivered through a delay line 34 to a sign detector 35 which will be hereinafter described in detail.

The output from the amplifier 33 is also delivered to a positive peak detector 36, which will be hereinafter described in detail, providing a sharp pulse output signal at each positive peak of an input signal. As noted above in connection with FIGURE 1*b*, each character at the time of its onset to the magnetic head produces a positive output pulse and thus, the sharp pulse output from the positive peak detector provides a time reference point from which sampling times can be measured during the scanning interval of each character scanned. The output pulse from the positive peak detector is fed through a cathode follower 37, provided for power amplification, to one input leg of a two input AND circuit 38. The output pulses from the positive peak detector 36 are also delivered through a cathode follower 39 and a double inverter 40, which serves to sharpen the pulses, to the SET or ON terminal of a trigger 41.

All of the triggers employed herein are positive logic bi-stable devices shifted by means of a positive going pulse. The input line directed to the lower right hand portion of each of the triggers shown in the drawings serves to shift the trigger to an ON condition, i.e., SET the trigger, and a positive going pulse input to the lower left hand line will shift the trigger to an OFF condition, i.e., RESET the trigger. When a trigger is in an OFF condition, the upper right hand or OFF output line is positive and when the trigger is in an ON condition, the upper left hand or ON output line is positive. Once a trigger is SET in an ON condition by a positive going pulse on its right hand or SET input line, it will remain in an ON condition until a positive going pulse is applied to its left hand or RESET input line. Triggers of this type are well known and thus, need not be described in detail herein. Similarly, the amplifier circuits, AND circuits, cathode follower circuits, inverter circuits and multivibrator circuits employed herein may be of conventional construction and thus need not be described in detail.

The ON side of the trigger 41 is connected through an inverter 42 and cathode follower 43 to a multivibrator 44. The OFF side of the trigger 41 is connected through a cathode follower 45 to the other input of the AND circuit 38.

Figure 4:
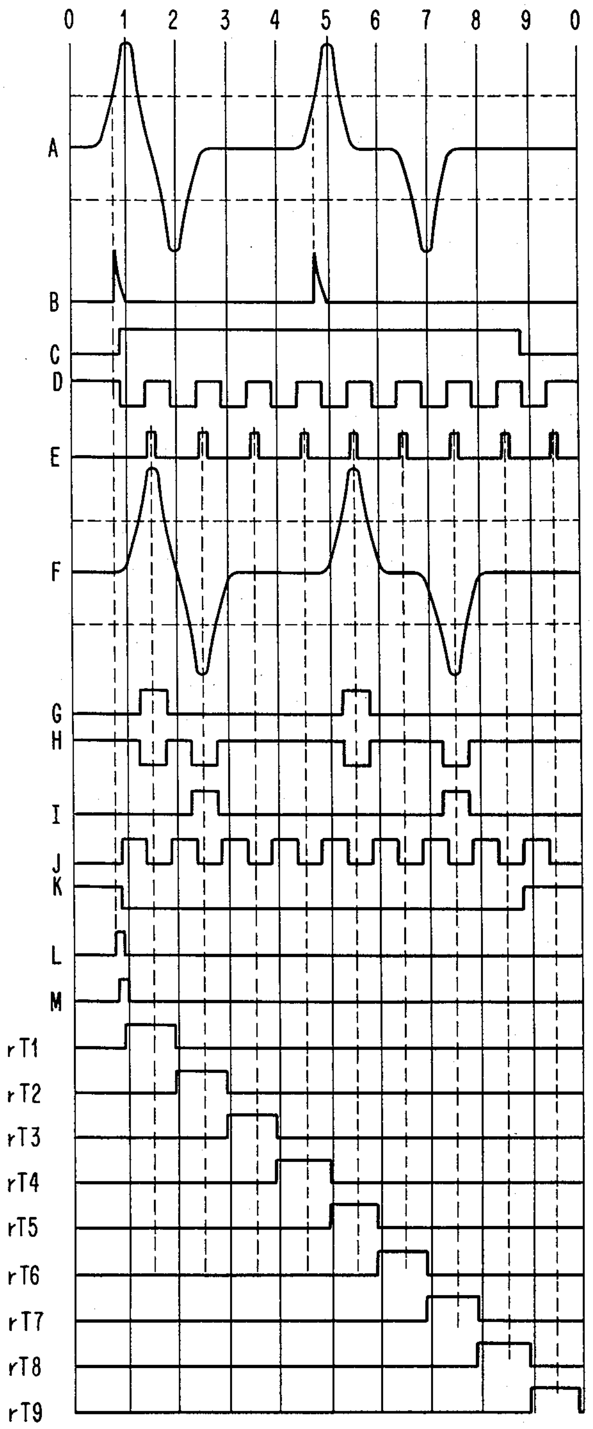
FIGURE 4 is a time diagram indicating the relative times of functioning of various apparatus shown in FIGURES 2 and 3.

Referring to FIGURE 4, there is shown on line A, a typical input signal produced by the numeric character 2 shown in FIGURE 1*a*. This and the other plots of FIGURE 4 are divided into time intervals by time lines 0–9 corresponding to the time lines shown in FIGURES 1*a* and 1*b*. A first positive pulse occurs in line A on the number 1 time line. On line B there is shown the pulse output from the positive peak detector 36 and these pulses occur when the input signal has reached approximately half its positive going amplitude. The trigger 41 is SET by this pulse after the pulse has passed through cathode follower 39 and the double inverter 40. Thus, the time of SET of the trigger 41 is somewhat displaced from the time of the positive peak detector output pulse. The time position of SET of trigger 41 is evident from the trigger ON side output signal shown on line C in FIGURE 4. The OFF side output signal of trigger 41 is shown on line K in FIGURE 4.

The ON side output of trigger 41 is inverted in inverter 42 and delivered to the astable multivibrator 44 setting the multivibrator into oscillation. The multivibrator 44 has two outputs as will be hereinafter described and these outputs are shown on lines D and J of FIGURE 4.

If, for example, a document is advanced at the rate of 5 milliseconds per inch and numeric characters are printed thereon with spacings of approximately 10 characters per inch, then there will be provided character spaces each having a 500 microsecond duration and if these character spaces are divided into ten sampling time periods, then the time interval per sampling time will be 50 microseconds. Under this arrangement the multivibrator 44 will be adjusted to oscillate one complete cycle of oscillation every 50 microseconds. In apparatus such as this the rate of document advance may be controlled to within plus or minus 2%. With a character scanning time of 10 sample intervals and this control of the rate of character advance, the frequency of oscillation of the multivibrator may be controlled with sufficient accuracy to provide sufficiently close synchronization between the multivibrator output and rate of character advance that the sampling time line positions will coincide sufficiently close with the positive and negative going pulses of the output wave to provide coincidence thereof during the latter sampling times of each character.

As previously noted the pulse output of the positive peak detector is delivered to the AND circuit 38. It has also been noted that the OFF side of trigger 41 is delivered through cathode follower 45 to the AND circuit 38. When the trigger 41 is OFF this is a positive polarity signal and due to the time delay of the pulses coming through the cathode follower 39 and the double inverter 40, there occurs an overlap of the positive output from the positive peak detector and the positive OFF output from the trigger 41. This coincidence will be evident from lines B and K in FIGURE 4. During this brief interval, there is an output from the AND circuit 38 through a double inverter 46 to a trigger 47 which will be hereinafter referred to as the home trigger.

This output, shown on line L in FIGURE 4, serves to SET the home trigger 47. Upon being SET, home trigger 47 delivers a positive pulse to the first trigger of a counting ring indicated generally at 48. The counting ring triggers are indicated as ${}_rT_1$–${}_rT_9$. The pulse from the home trigger serves to condition the trigger ${}_rT_1$.

The output from the multivibrator 44 delivering positive going pulses shown on line J in FIGURE 4, is fed through an amplifier and pulse sharpener 49 to the ON input of each of the ring triggers ${}_rT_1$–${}_rT_9$. However, at this time only the ${}_rT_1$ trigger has been conditioned and thus only this trigger is SET. This type of "condition" and "SET" trigger operation is well known in the art and thus need not be described in detail herein.

As soon as the trigger ${}_rT_1$ is SET, an output pulse is delivered therefrom to the RESET input of the home trigger 47. Thus, as indicated on line M in FIGURE 4, the home trigger is ON only for the time duration between the period of output from the AND circuit 38 and the time of the output of ${}_rT_1$ resulting from the first positive going pulse from the multivibrator 44.

Thereafter the ring 48 is stepped by each successive positive going output pulse from the multivibrator 44. The output of each trigger in the ring serves to condition the next trigger which then receives the next multivibrator pulse and is SET thereby. As each of the ring triggers is SET, its output is delivered back to the preceding trigger serving to RESET the preceding trigger OFF and delivered ahead to the next succeeding trigger to condition the next succeeding trigger to be SET by the next following positive going output pulse from the multivibrator. This succession of SET and RESET is shown on lines ${}_rT_1$ to ${}_rT_9$ in FIGURE 4.

The ON output of each ring trigger is delivered through a respective cathode follower 50 to three AND circuits. The ${}_rT_1$ output is delivered to AND circuits indicated as $+A_1$, $0A_1$ and $-A_1$. Similarly each of the other ring triggers delivers an output to three AND circuits similarly identified with relation to their associated ring trigger. Each of these AND circuits controls an associated trigger forming, as will be described, a time polarity storage matrix indicated generally at 58.

As previously noted the multivibrator 44 also provides negative going oscillations, as shown on line D in FIGURE 4. These oscillations are delivered through a cathode follower 51, employed for power amplification, and a double inverter 52 employed for pulse sharpening to a single shot or monostable multivibrator 53. The output of the single shot 53 is delivered through a cathode follower 54 to one input of each of three two way AND circuits, 55, 56 and 57. The time position of this pulse is indicated on line E of FIGURE 4.

When the typical output from amplifier 33, shown on line A of FIGURE 4, has passed through the delay line 34, it is displaced to the position shown in line F of FIGURE 4. This displacement serves to bring the positive and negative going pulse time into substantial coincidence with the pulse times of the output of the single shot 53 as shown on line E.

The output from the delay line 34 is fed to the algebraic sign detector 35. This sign detector will be described hereinafter in greater detail and provides three outputs in the form of positive signals delivered to the other input of each of the two way AND circuit 55, 56 and 57. The sign detector output delivered to the AND circuit 55 exists during positive going excursions of the input to the sign detector. The sign detector output to the AND circuit 57 occurs during negative going excursions of the input to the sign detector, and the sign detector output to the AND circuit 56 occurs during intermediate periods and when the input to the sign detector is substantially zero. These three positive going outputs are indicated at G, I and H, respectively, in FIGURE 4. As will be evidenced therefrom, the positive line output signal is coincident with the positive going pulse of the input signal and with the pulse of the single shot. The negative line output signal is coincident with the negative going pulse of the input. The zero line output is positive for the brief time interval between the positive and negative time interval and also is positive during the time interval between the first negative going pulse and the second positive going pulse of the input signal.

Figure 2B:
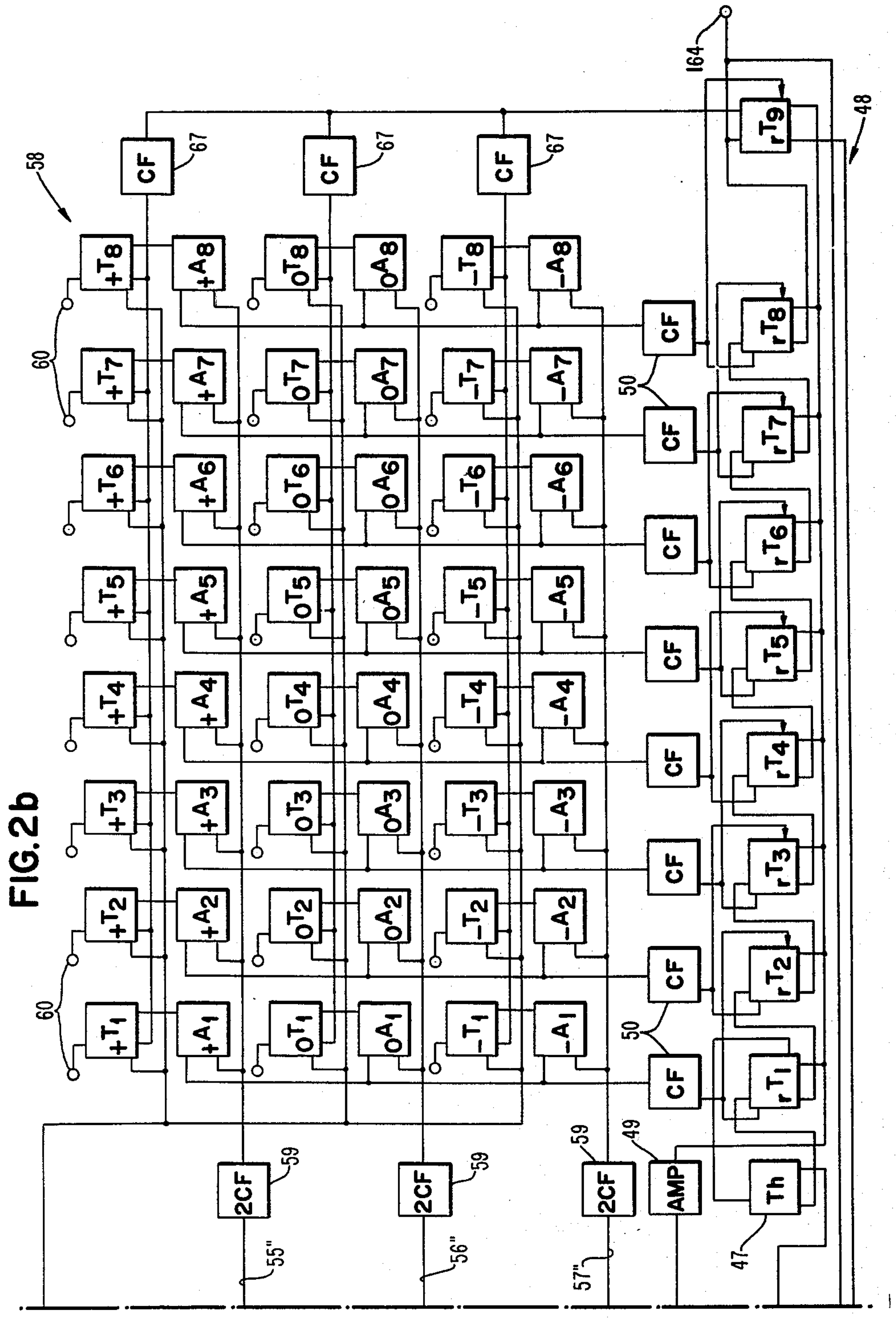

During the time interval of coincidence of the output pulse from the single shot 53 and an output signal from the sign detector on one of the three output lines 55′, 56′, or 57′, an output pulse is delivered from the corresponding AND circuit 55, 56, or 57 to one input of each of the two way AND circuits connected to the corresponding line 55″, 56″, or 57″ in the time polarity storage matrix indicated generally at 58 in FIGURE 2. A double cathode follower 59 is inserted in each of these lines for power amplification. As previously noted the other input to each of these AND circuits is provided by respective ring triggers ${}_rT_1$–${}_rT_9$. As will be evident from the time diagram of FIGURE 4, during the period of coincidence of an output from the single shot 53 shown on line E and the output of each of the ring triggers, one AND circuit of the corresponding column in the time polarity matrix will pass a signal and SET its adjacent matrix trigger.

Thus, for example, during the time when the ${}_rT_6$ is ON, the time polarity matrix trigger $+T_6$, $0T_6$ or $-T_6$ may be ON depending upon the polarity of the coincident portion of the input wave delivered to the sign detector. It will be evident that as the ring steps along and the successive ring triggers are turned ON and OFF, successive AND circuit columns are conditioned and successive time polarity storage matrix triggers are SET depending upon the polarity of the delayed input wave reaching the sign detector at each particular sampling time as determined by the multivibrator 44 and the ring trigger SET thereby. The result is that the time polarity storage matrix 58 receives and stores indications of a positive, zero and negative pulse-time conditions of the input wave.

It will be evident from the foregoing that the numeric character 0 can be recognized by a time polarity storage matrix condition in which the following triggers are SET: $-T_2$, $0T_3$, $0T_4$, $0T_5$, $0T_6$, $+T_7$ and $-T_8$. All of the other triggers will be in a RESET condition. If the ON side output terminals 60, of these seven particular triggers, are connected to an eight way AND circuit and if the output from the ${}_rT_9$ ring trigger is also connected to the eight way AND circuit, then for the time interval during which the ${}_rT_9$ trigger is SET, the eight way AND circuit will provide an output identifying the scanned character as being the numeric character 0.

Figure 3:
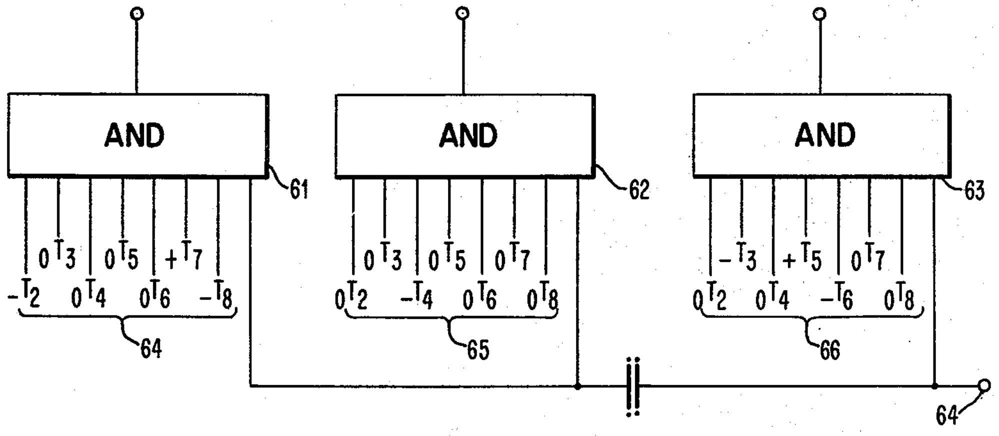
FIGURE 3 is a diagrammatic showing of recognition circuits responsive to the condition of the time polarity storage matrix shown in FIGURE 2 by which a scanned character is recognized.

In FIGURE 3 there are shown eight way AND circuits 61, 62 and 63 for numeric characters 0, 1 and 9, respectively. The outputs from the particular triggers SET for the numeric character 0 are indicated at 164, the triggers SET for the numeric character 1 are indicated at 65 and the triggers SET for the numeric character 9 are indicated at 66. While the eight way AND circuits for the other characters are not shown, it will be evident from FIGURE 1*b*, which of the various triggers will be turned on by each of these characters and that similar recognition AND circuits will be provided therefor. The eight way AND circuits each receives its final or eighth pulse from the output of the trigger ${}_rT_9$ through a connection between terminals 164 in FIGURES 2*b* and 3. As previously noted the output from each of the ten AND circuits, three of which are shown in FIGURE 3, may be delivered to any apparatus desirably employed for receiving and responding to an indication of the identity of the character scanned.

It will be evident that in the disclosed arrangement recognizing the numeric characters 0–9 shown in FIGURE 1*a*, not all of the triggers of the time polarity matrix are employed. For example, the $0T_1$ and $-T_1$ triggers in the column above trigger ${}_rT_1$ should never be set because, as is evident from FIGURE 1*b*, a positive pulse always occurs on the first time line. Thus, if desired, the unused triggers may be omitted. Alternatively, outputs from these normally unused triggers may be connected to error indicating devices not shown herein.

As previously described the trigger 41 is SET by the arrival of the first pulse output from the positive peak detector. The trigger 41 is RESET by the ON side output of ring trigger ${}_rT_9$ when ${}_rT_9$ is SET. When the trigger 41 is RESET, its OFF side output goes positive and this output pulse is delivered to a single shot or monostable multivibrator 264, the output of which is delivered to the RESET input of ring trigger ${}_rT_9$ and serves to RESET this last trigger. The trigger 41 then remains in an OFF condition until the next first positive pulse of the next character scanned provides an output from the positive peak detector SETTING the trigger to an ON condition. Thus, the period during which the selected eight way AND circuit is producing an indication of the character scanned is equivalent to the time interval during which the ${}_rT_9$ trigger is ON. This time interval is indicated on the line ${}_rT_9$ in FIGURE 4.

It is also necessary to reset all of the time-polarity storage matrix triggers which have been SET. This reset is provided by the OFF output from the ${}_rT_9$ which is delivered through cathode followers 67, for power amplification to each of the rows of (+), (0) and (−) triggers, respectively, to reset these triggers. This reset occurs at the time that the trigger ${}_rT_9$ is reset and thus, by the time the next successive character is to be scanned, i.e., at the next 0 time line as shown in FIGURES 1*b* and 4, the time-polarity storage matrix, the ring triggers and the multivibrator control trigger 41 are all reset awaiting the next operation of the circuit.

A light source 68 is positioned along the path of advance of the document 28 immediately beyond the read head 30. Light from the light source is adapted to impinge on a photocell 69 when there is no document positioned therebetween. Output from the photocell 69, occurring when light impinges thereon, is amplified by an amplifier 70 and is delivered to the reset terminals on the triggers in the time polarity matrix 58 to reset all of these triggers. Although not shown in the drawing it will be evident that the output of the amplifier 70 may be transferred to the reset side of other triggers in the circuit in order to insure reset of all of the triggers, which should be reset up to the beginning of a cycle of operation of the apparatus.

The position of the light source 68 and photocell 69 may be selected with regard to the position of the read head 30 and the space between successive documents to insure reset of the triggers prior to the arrival of a next successive document at the read head. Furthermore, the position of the light source 68 and the photocell 69 may be selected with regard to the position of the read head 30 and the space between the leading edge of a document and characters on the document to be read to insure reset of the triggers up to the beginning of cycle of operation of the reading apparatus.

Figure 5:
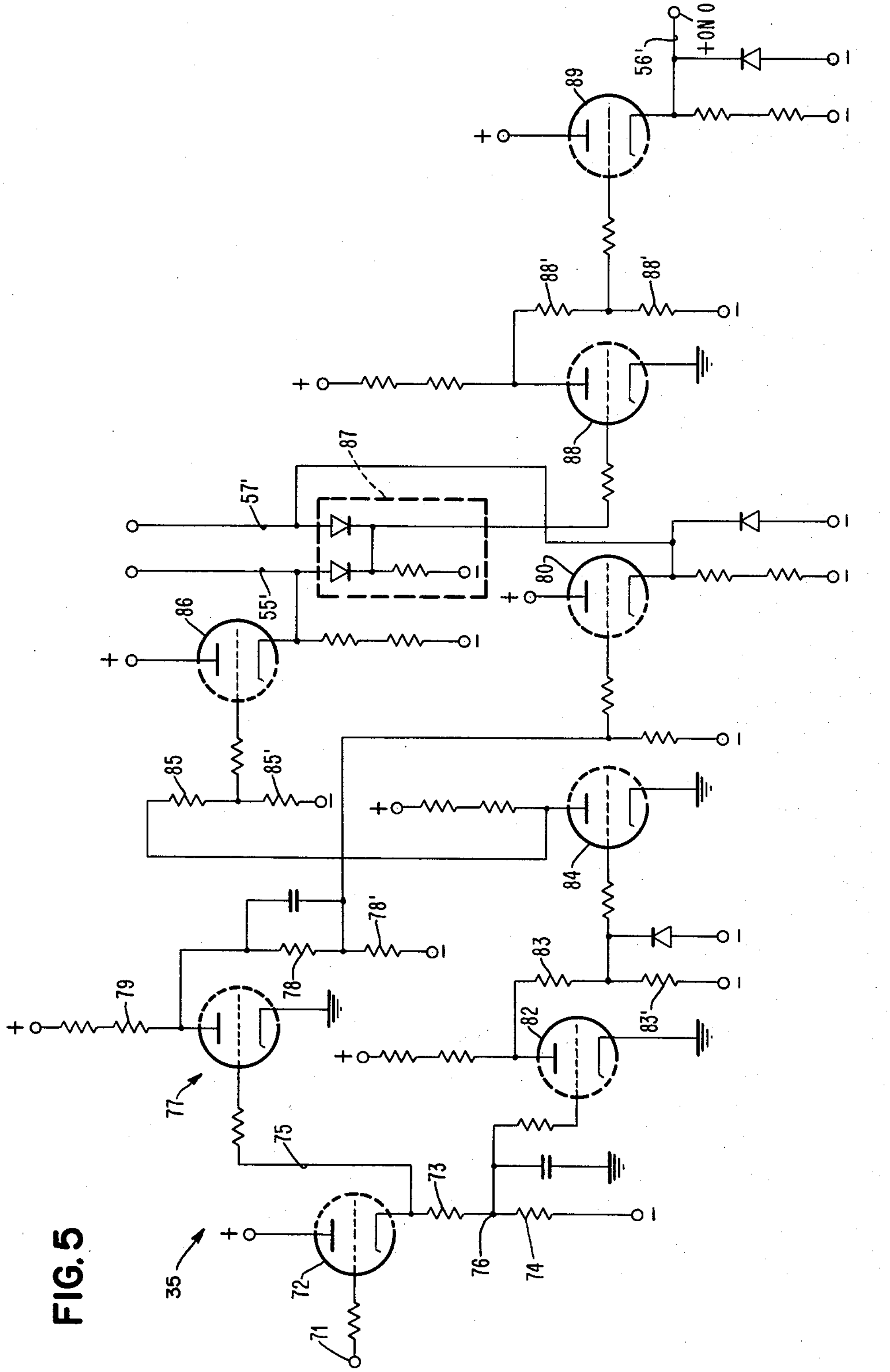
FIGURE 5 is an electrical diagram showing details of electrical elements involved in the sign detector shown in FIGURE 2*a*.

In FIGURE 5, there is shown the electrical apparatus involved in the sign detector shown generally at 35 in FIGURE 2*a*. The input to the sign detector received from the delay circuit is applied to terminal 71 in FIGURE 5, which is connected to the grid of a triode 72. The triode 72 is connected in cathode follower arrangement with its anode connected to a source of positive potential and its cathode connected through series resistances 73 and 74 to a source of negative potential.

Two outputs are taken from this cathode follower circuit. One of the outputs is taken on line 75 from the cathode of tube 72 and the other output is taken on line 76 from the tap between the resistances 73 and 74.

Considering first the output on line 75, this output is connected to the grid of a triode 77. The grid is so biased that, for an input sine wave on the grid of triode 72, the triode 77 will be conducting for all but the negative most half of the negative portion of the input wave. For example, the output appearing on line 75 may be a sine wave swinging from +10 to −10 volts and the tube 77 will be cut off below −5 volts, thus the output from the tube 77 will be in the form of a positive output of relatively low voltage having a positive voltage peak during the time when the tube is not conducting.

This output is fed to the voltage divider arrangement made up of resistances 73 and 78', which is provided for voltage level adjustment reducing the output signal to a negative signal except for the time duration of the positive output peak. This positive pulse signal is delivered to the grid of a triode 80 having its output in cathode follower arrangemtnt delivered to line 57' which is the line carrying the negative output signal from the sign detector 35 shown on line 1 of FIGURE 4. It will be noted that this is a positive polarity signal but it is of positive polarity only during the time interval when the cathode voltage of tube 72 was below −5 volts.

The other output from the tube 72 is taken on line 76 and is delivered to the grid of a triode 82. The signal appearing on line 76 when a sine wave is applied to the triode 72 would be, for example, a sine wave swinging from −20 to 0 volts. The triode 82 is cut off by a grid voltage of lower than −5 volts and hence, the output on the plate of the triode 82 is a relative high positive voltage except for the time during which the tube was conducting. This output is fed through resistances 83, 83' forming a voltage divider arrangement providing voltage level adjustment resulting in the negative going output pulse being a negative voltage and the remainder of the output being positive voltage. This signal is fed to triode 84 which serves as an inverter. The output from the inverter 84 is then a positive going pulse for a time duration equal to the time at which the signal on line 76 was above −5 volts. The output from the inverter is fed through a voltage divider 85, 85' in order to reduce the amplitude of the positive going signal. The output from the voltage divider is fed through a triode 86 which is connected in cathode follower arrangement to the line 55' which is the line carrying the positive output from the sign detector 5 as shown on line G in FIGURE 4. From the foregoing, it will be evident that line 55' is positive during the time intervals during which the output signal from the triode 72 on line 76 is between 0 and −5 volts.

Thus, the output appearing on lines 55' and 57' will be positive for those time intervals during the most positive and most negative excursions, respectively, of the input signal from the reading head. During those time intervals when neither line 55' nor 57' is positive, there appears a positive potential on the zero output line 56'. This signal is provided by the output of an AND circuit shown within the outline 87 in FIGURE 5. This is a negative AND circuit providing an output to a triode 88 when both the lines 55' and 57' are negative. The triode 88 serves as an inverter and delivers its output through a voltage divider 88' to a triode 89 which is in cathode follower arrangement having its output connected to line 56', which is the line carrying the zero outputs from the sign detector 35 as shown on line H in FIGURE 4. Thus, when negative signals appear on both lines 55' and 57', a positive signal will appear on line 56'.

It will be evident that the actual voltage levels of the input wave at which signals are provided on lines 55' and 57' may be shifted depending upon particular conditions involved. It is desirable, however, that the zero line carry signals of potentials extending to moderate degrees on either side of the zero axis for the reason that this output range will encompass the range of most of the background noise and only true information bearing positive and negative input wave excursions, such as those shown in FIGURE 1*b*, will be reflected as positive going output signals on line 55' and 57' to the positive and negative time polarity storage matrix triggers.

Figure 6:
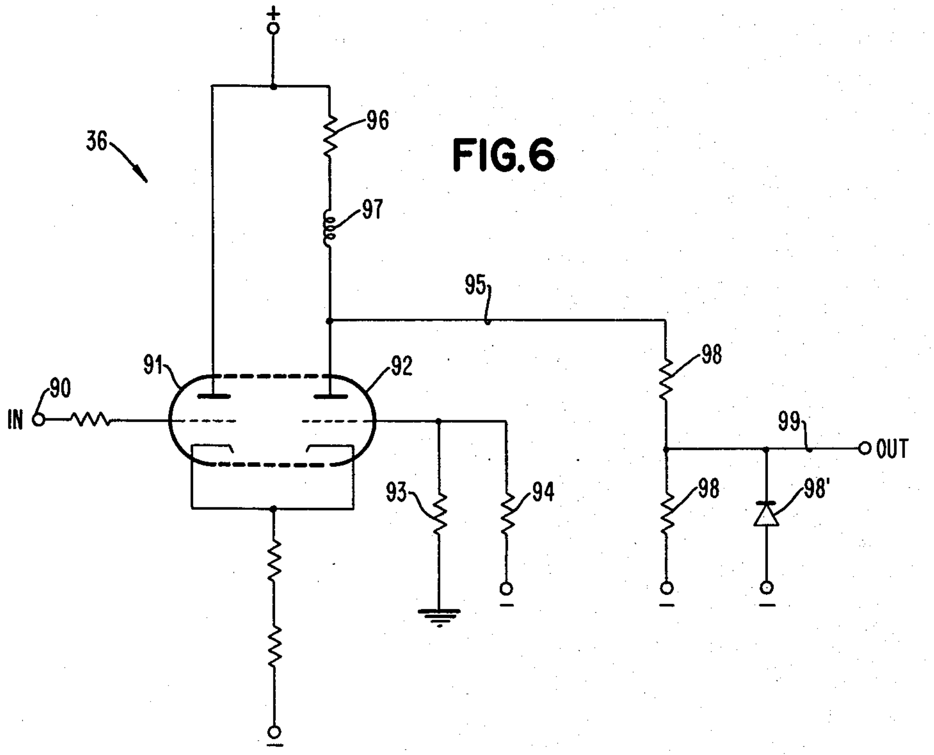
FIGURE 6 is an electrical diagram showing details of electrical elements involved in the positive peak detector shown in FIGURE 2*a*.

The positive peak detector 36, referred to in FIGURE 2, is indicated at generally 36 in FIGURE 6. This circuit receives its input from the amplifier 33 at terminal 90. The input is impressed on the grid of a triode 91. The output from triode 91 is connected in cathode follower arrangement to the cathode of a triode 92. The triode 92 is connected in grounded grid arrangement with its grid connected to ground through a resistance 93 and connected to a source of negative potential through a resistance 94. The output from the grounded grid triode 92 is taken from its plate on line 95.

This tube 92 is normally conductive and it is only when the cathode voltage is raised sufficiently high in a positive direction by the positive peak on an incoming signal that the tube cuts off and becomes non-conductive. When this occurs, the plate, which is connected to a positive potential source through a plate resistance 96 and a suitable inductance 97, swings widely positive and provides a positive going output pulse. This output pulse is delivered through a voltage leveler, in the form of a voltage divider composed of resistances 98 and a diode 98', and is delivered on line 99 to the cathode follower 39 shown in FIGURE 2.

It will be evident that by adjusting the grid bias and the grid and cathode resistances of the positive peak detector circuit, the output pulse from this circuit may be timed to occur at any desired portion of a positive input wave. Preferably, this timing is made to occur when the input signal has gone positive in its positive excursion to approximately half its total amplitude. It will be seen from lines B and A of the time diagram of FIGURE 4 that the peak output of the positive peak detector is shown occuring during this time interval.

From the foregoing, it will be noted that the invention provides a unique configuration of characters serving to provide a particularly readily identifiable set of output signals by which the individual characters may be identified and by which characters may be discriminated from one another.

The invention also provides a unique recognition circuit which is relatively simple and which may be made to respond to various input wave forms in order to identify characters producing the various input wave forms.

It should, however, be noted that the particular combination of the character configuration described and recognition circuit described provides a particularly desirably employed arrangement by which the unique output waves produced by these particular characters when scanned, can be received and used to identify the characters. In this connection it is noted that the system is, in effect, a derivative system wherein the derivative wave, resulting from scanning of magnetized characters by means of a magnetic head, provides the information by which the characters are identified by recognition circiutry. This is quite different from integration type systems wherein the time duration and amplitude of signals are employed for character identification. The system is also very different from pulse code systems where the combination of time duration and pulse sequence of code bits is employed to represent information. The present system is truly a character recognition system which is responsive to the output wave signal of a scanning head which is the derivative of or which is responsive to the rate of change of magnetic areas forming the characters to be recognized.

While the disclosed embodiment of the invention relates to numeric characters, it will be evident that the invention may be employed for reading other human language characters such as stylized alphabetic characters. It will be evident that this and other modifications may be made to the embodiment of the invention disclosed herein without departing from the scope of the invention as set forth in the following claims.

We claim:

1. Apparatus for recognizing characters comprising means for linearly scanning a character and producing an output wave having relatively positive and negative excursions representative of a character scanned, means responsive to a said output wave for producing one output in response to relatively positive excursions of said wave and another output in response to relatively negative excursions of said wave, timing means operative in response to the first excursion of a said output wave for establishing successive sampling times, means including a matrix including two groups of storage elements controlled by said timing means for storing indications of polarity and time of occurrence of excursions of said wave, elements of one of said two groups of storage elements being successively responsive to said one output during successive predetermined sampling times and elements of the other of said two groups of storage elements being successively responsive to said other output during successive sampling times, and means responsive to selected elements of said matrix for indicating the recognition of a specific character upon the establishment of a predetermined pattern of matrix storage element conditions.

2. Apparatus for recognizing characters comprising means for linearly scanning a character and producing an output wave having relatively positive and negative excursions on opposite sides of a neutral axis and characteristic of the character scanned, means responsive to said output wave for producing one output in response to relatively positive excursions of said wave, another output in response to relatively negative excursions of said wave and a third output in response to relatively neutral portions of said wave, timing means operative in response to the first excursion of a said output wave for establishing successive sampling times, means including a matrix comprising three groups of storage elements controlled by said timing means for storing indications of polarity conditions and time of occurrence thereof of said wave, elements of one of said three groups of storage elements being successively responsive to said one output during successive sampling times, elements of a second of said three groups of storage elements being successively responsive to said other output during successive sampling times, elements of the third of said three groups of storage elements being successively responsive to said third output during successive sampling times, and means responsive to selected elements of said matrix for indicating the recognition of a specific character upon the establishment of a predetermined pattern of matrix storage element conditions.

References Cited in the file of this patent

UNITED STATES PATENTS

| | | |
|---|---|---|
| 2,924,812 | Merritt et al. | Feb. 9, 1960 |
| 3,000,000 | Eldredge | Sept. 12, 1961 |

FOREIGN PATENTS

| | | |
|---|---|---|
| 785,853 | Great Britain | Nov. 6, 1957 |

OTHER REFERENCES

"Teaching Machines to Read," by Eldredge, Kamphoefner or Wendt, First Quarter 1957, SRI Journal, pp. 18 to 23.

Arithmetic Operations in Digital Computers, R. K. Richards, Comparison of Parallel and Serial Operation, pp. 82–83.